(12) United States Patent
Chen et al.

(10) Patent No.: US 8,805,186 B2
(45) Date of Patent: Aug. 12, 2014

(54) SINGLE OPTICAL FIBER REPEATER SYSTEM

(71) Applicant: Browave Corporation, Hsinchu (TW)

(72) Inventors: Yeongher Chen, Hsinchu (TW); Haolin Chang, Hsinchu (TW); Yousheng Li, Chengdu (CN)

(73) Assignee: Browave Corporation, Hsin-Chu (TW)

( * ) Notice: Subject to any disclaimer, the term of this patent is extended or adjusted under 35 U.S.C. 154(b) by 76 days.

(21) Appl. No.: 13/665,887

(22) Filed: Oct. 31, 2012

(65) Prior Publication Data

US 2014/0119744 A1  May 1, 2014

(51) Int. Cl.
*H04B 10/25* (2013.01)
(52) U.S. Cl.
USPC .............................................................. 398/42
(58) Field of Classification Search
CPC .................................................. H04B 20/2503

USPC ............................................................ 398/42
See application file for complete search history.

(56) References Cited

U.S. PATENT DOCUMENTS 5,177,803 A * 1/1993 Newhouse et al. ............. 385/43
2011/0200329 A1* 8/2011 McEwan et al. ................ 398/41

* cited by examiner

*Primary Examiner* — Leslie Pascal

(57) ABSTRACT

A single optical fiber repeater system is provided, including a first external device, for generating a first signal; a second external device, for generating a second signal; a first optical fiber sharing apparatus, for transporting the first signal and receiving the second signal; a second optical fiber sharing apparatus, for transporting the second signal and receiving the first signal; and an optical fiber, for transporting the first signal and the second signal. Second optical fiber sharing apparatus converts the wavelength of the second signal into a wavelength different from that of the first signal for transport in the optical fiber. First optical fiber sharing apparatus converts the wavelength of the second signal into a wavelength identical to the wavelength of the first signal and transports to the first external device.

3 Claims, 4 Drawing Sheets

SINGLE OPTICAL FIBER REPEATER SYSTEM

FIELD OF THE INVENTION

The present invention generally relates to an optical fiber signal transport system, and more specifically to a single optical fiber repeater system using a single optical fiber to transport optical fiber signal using different wavelengths.

BACKGROUND OF THE INVENTION

FIG. 1 shows a schematic view of a conventional optical fiber signal transport system. As shown in FIG. 1, the conventional optical fiber signal transport system includes a first splice terminal 11, a second splice terminal 13, a first optical fiber 21, a second optical fiber 23, a first packet transport device 31 and a second packet transport device 33. First splice terminal 11 is connected to first packet transport device 31. First packet transport device 31 is for generating signals transported from first splice terminal 11, or for processing signals received by first splice terminal 11. Similarly, second splice terminal 13 is connected to second packet transport device 33. Second packet transport device 33 is for generating signals transported from second splice terminal 13, or for processing signals received by second splice terminal 13.

First splice terminal 11 is connected to first optical fiber 21 and second optical fiber 23. First splice terminal 11 transports signals through first optical fiber 21 to second splice terminal 13 and receives signals through second optical fiber 21 from second splice terminal 13, wherein signals are transported using a same wavelength in first optical fiber 21 and second optical fiber 23.

In actual deployment, the physical distance between first packet transport device 31 and second packet transport device 33 may be tens of kilometers, or even hundreds. Length L1 of first optical fiber 21 and length L2 of second optical fiber 23 are hard to be identical. Therefore, because of asymmetry in length, an obvious latency problem may occur and lead to delay of processing time data packets by existing operating system (OS), and the time delay is proportional to $$e^{j\frac{2\pi}{\lambda} \cdot n \cdot Z},$$

where Z is length. Variation in length will cause change in time delay. To solve the problem of time delay, a usual approach is to use point clock to establish time domain in first splice terminal 11 and second splice terminal 13 to perform compensation.

However, as the improvement in hardware and expansion of optical fiber system, the time delay situation constantly changes so that the user experience becomes poor and point clock adjustment is constantly required by skilled technicians, resulting in increase in operation cost. Hence, it is desired to devise an improvement over conventional techniques.

SUMMARY OF THE INVENTION

The primary object of the present invention is to provide a single optical fiber repeater system, including a first external device, for generating a first signal; a second external device, for generating a second signal; a first optical fiber sharing apparatus, connected to the first external device, for transporting the first signal from and receiving the second signal to the first external device; a second optical fiber sharing apparatus, connected to the second external device, for transporting the second signal from and receiving the first signal to the second external device; and an optical fiber, connected to the first optical fiber sharing apparatus and the second optical fiber sharing apparatus, for transporting the first signal and the second signal.

The second optical fiber sharing apparatus converts wavelength of the second signal to a wavelength different from the first signal for transporting in the optical fiber. The first optical fiber sharing apparatus then converts wavelength of the received second signal into a wavelength identical to wavelength of the first signal and then passes to the first external device.

The first optical fiber sharing apparatus includes a first filter, a second filter, a first splice terminal and a first wavelength convertor. The first filter is connected to the first external device and the first splice terminal. The first splice terminal is connected to the first filter and the second filter. The first wavelength convertor is connected to the second filter and the first external device. The second optical fiber sharing apparatus includes a third filter, a fourth filter, a second splice terminal and a second wavelength convertor. The third filter is connected to the second external device and the second splice terminal. The second splice terminal is connected to the third filter and the fourth filter. The second wavelength convertor is connected to the fourth filter and the second external device. The first splice terminal and the second splice terminal are connected through the optical fiber.

The first signal generated by the first external device has a first wavelength. The first filter allows the first signal having the first wavelength to be transported through the first splice terminal, the optical fiber and to the second splice terminal, and then through the third filter to the second external device. The second signal generated by the second external device has the first wavelength. The second signal passes through second wavelength convertor and the first wavelength is converted into a second wavelength. The converted second signal having the second wavelength passes the fourth filter to the second splice terminal. At this point, the third filter blocks the second signal having the second wavelength and the second signal passes through the optical fiber to the first splice terminal. The first filter blocks the second signal having the second wavelength, but the second filter allows the second signal having the second wavelength to pass. Then, the first wavelength convertor converts the second signal from the second wavelength into the first wavelength, and then transports the second signal having the first wavelength to the first external device.

In actual application, the first wavelength and the second wavelength are any different two wavelengths selected from 600 nm to 1700 nm. With a single optical fiber, signals can be transported in different wavelengths. Because the transport and the receiving share the same path, the time delay caused by path length asymmetry can be greatly reduced, and no regular time compensation correction is required; thus, material cost and labor cost are greatly reduced.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
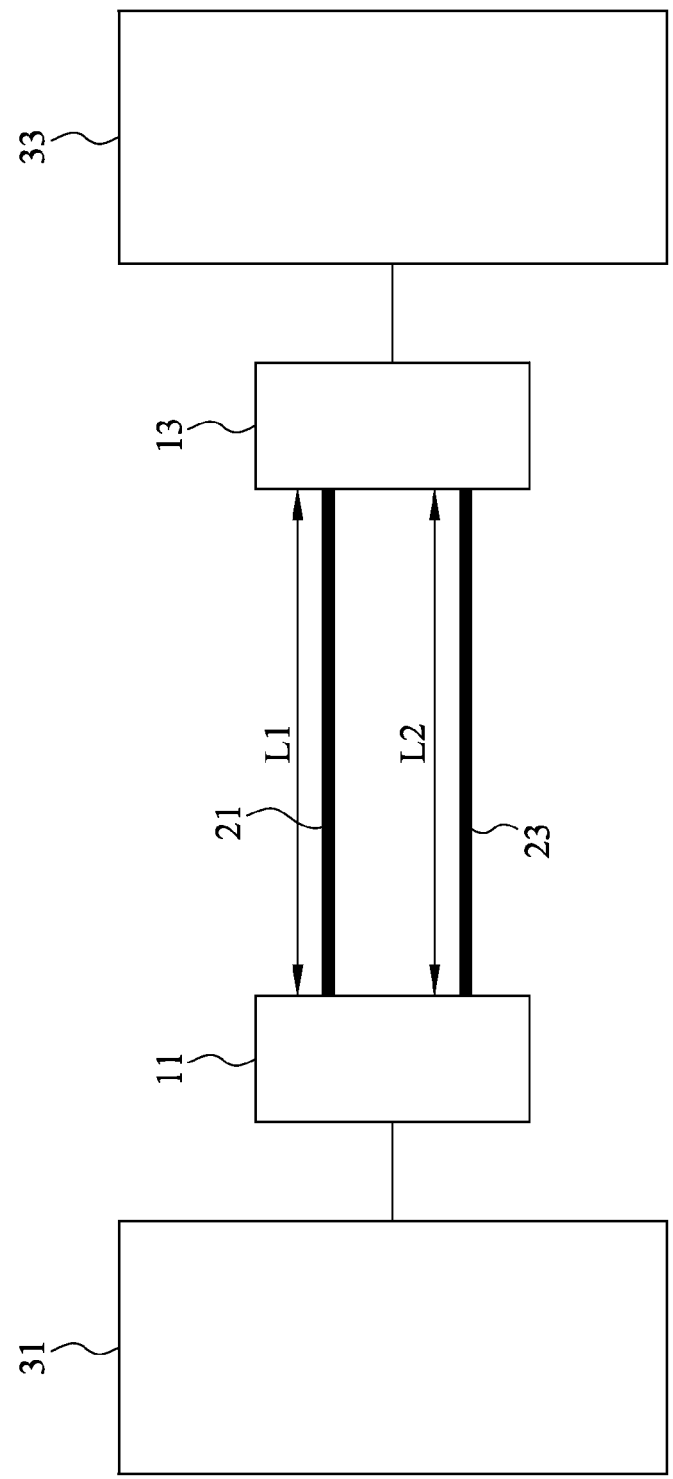
FIG. 1 shows a schematic view of a conventional optical fiber signal transport system.
Figure 2:
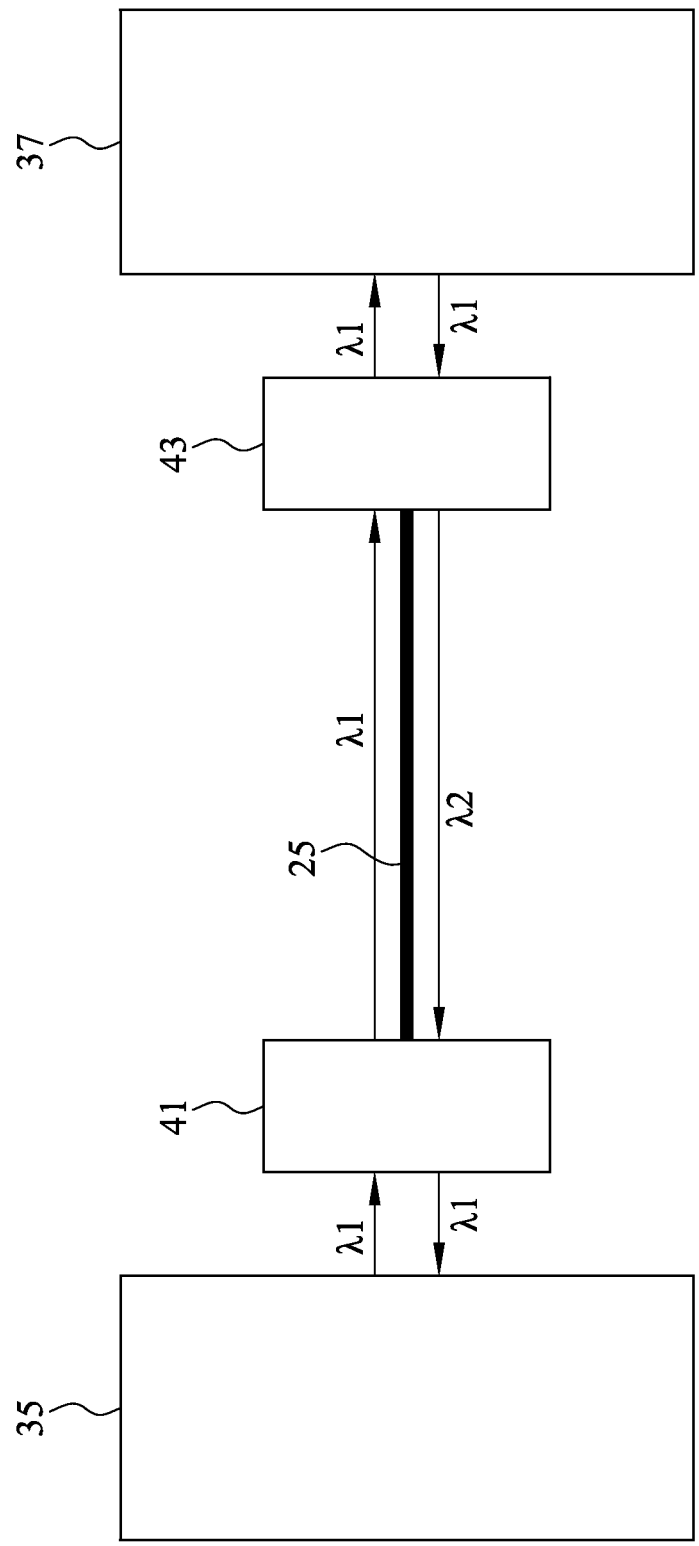
FIG. 2 shows a schematic view of the first embodiment of the single optical fiber repeater system according to the invention.

FIG. 2 shows a schematic view of the first embodiment of the single optical fiber repeater system according to the invention. As shown in FIG. 2, a single optical fiber repeater system according to the invention includes an optical fiber 25, a first external device 35, a second external device 37, a first optical fiber sharing apparatus 41 and a second optical fiber sharing apparatus 43. First external device 35 is connected to first optical fiber sharing apparatus 41, for generating a first signal to be transported by first optical fiber sharing apparatus 41, or for processing a second signal received by first optical fiber sharing apparatus 41. Similarly, second external device 37 is connected to second optical fiber sharing apparatus 43, for generating the second signal to be transported by second optical fiber sharing apparatus 43, or for processing the first signal received by second optical fiber sharing apparatus 43. First optical fiber sharing apparatus 41 and second optical fiber sharing apparatus 43 are connected through optical fiber 25. Signals transported by first external device 35 and second external device 37 are all transported through optical fiber 25, using similar but not identical wavelengths. For example, signals from first external device 35 are transported in wavelength λ1 and signals from second external device 37 are transported in wavelength λ2. As time delay is proportional to $$e^{j\frac{2\pi}{\lambda} \cdot n \cdot Z},$$

impact of time delay will be reduced if the wavelengths are close under the circumstances of having the same distance.

Figure 3:
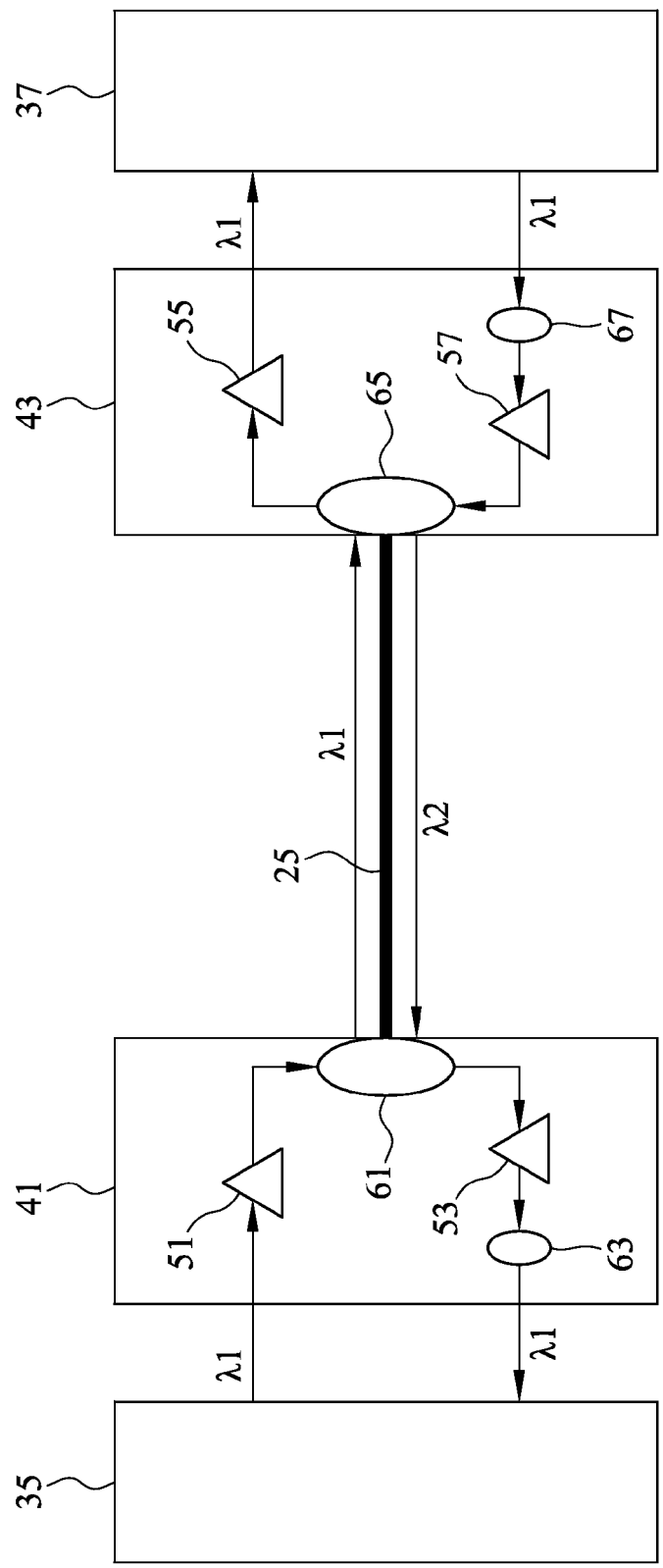
FIG. 3 shows a schematic view of optical fiber sharing apparatus of the single optical fiber repeater system according to the present invention.

FIG. 3 shows a schematic view of optical fiber sharing apparatus of the single optical fiber repeater system according to the present invention. As shown in FIG. 3, first optical fiber sharing apparatus 41 includes a first filter 51, a second filter 53, a first splice terminal 61 and a first wavelength convertor 63. First filter 51 is connected to first external device 35 and first splice terminal 61. First splice terminal 61 is connected to first filter 51 and second filter 53. First wavelength convertor 63 is connected to second filter 53 and first external device 35. Similarly, second optical fiber sharing apparatus 43 includes a third filter 55, a fourth filter 57, a second splice terminal 65 and a second wavelength convertor 67. Third filter 55 is connected to second external device 37 and second splice terminal 65. Second splice terminal 65 is connected to third filter 55 and fourth filter 57. Second wavelength convertor 67 is connected to fourth filter 57 and second external device 37. First splice terminal 61 and second splice terminal 65 are connected through optical fiber 25.

The first signal generated by first external device 35 has a first wavelength λ1. First filter 51 allows the first signal having first wavelength λ1 to be transported through first splice terminal 61, optical fiber 25 and to second splice terminal 65, and then through third filter 55 to second external device 37. The second signal generated by second external device 37 has first wavelength λ1. The second signal passes through second wavelength convertor 67 and first wavelength λ1 is converted into a second wavelength λ2. The converted second signal having second wavelength λ2 passes fourth filter 57 to second splice terminal 65. At this point, third filter 55 blocks the second signal having second wavelength λ2 and the second signal passes through optical fiber 25 to first splice terminal 61. First filter 51 blocks the second signal having second wavelength λ2, but second filter 53 allows the second signal having second wavelength λ2 to pass. Then, first wavelength convertor 63 converts the second signal from second wavelength λ2 into first wavelength λ1, and then transports the second signal having first wavelength λ1 to first external device 35.

Figure 4:
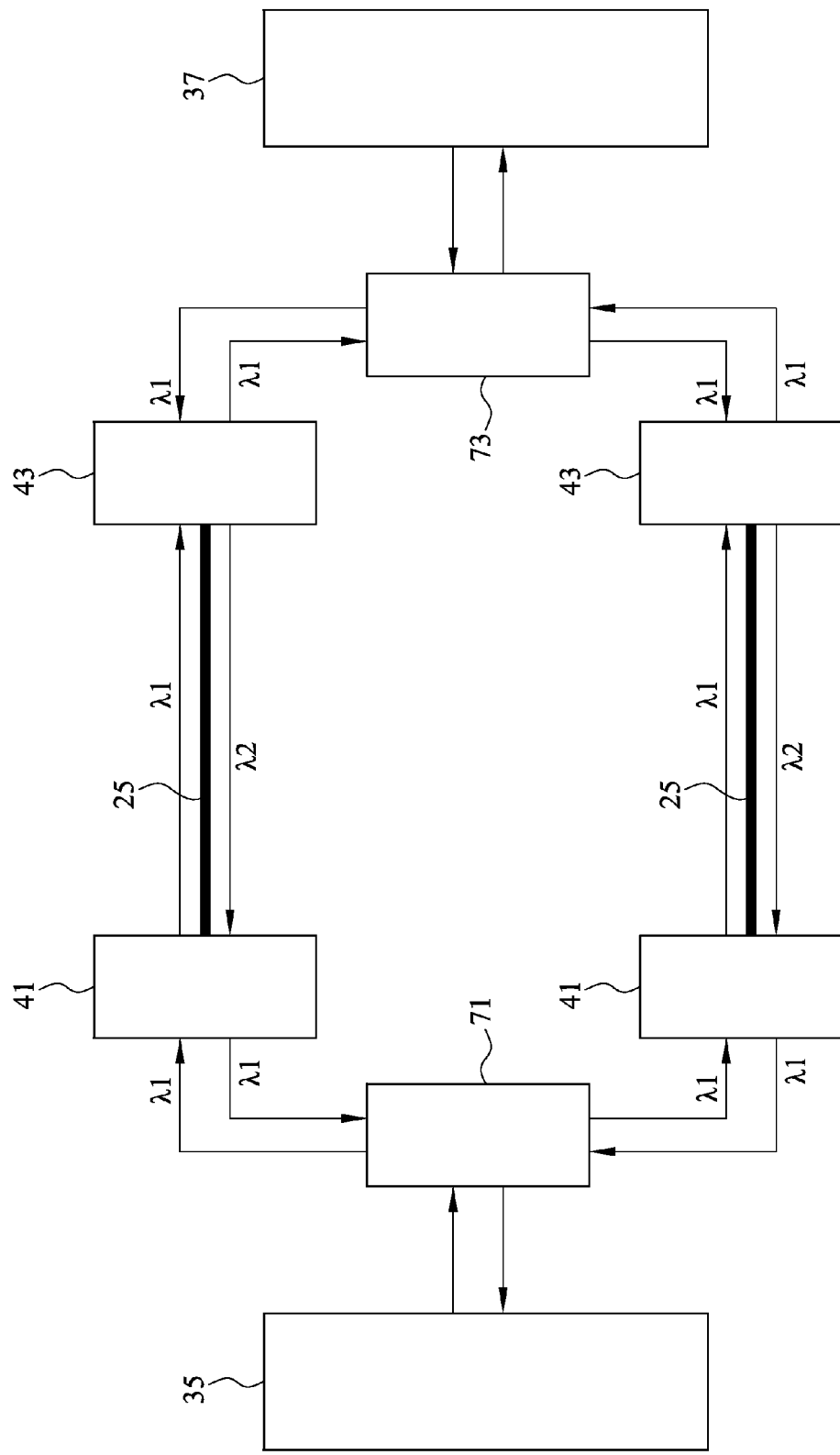
FIG. 4 shows a schematic view of the second embodiment of the single optical fiber repeater system according to the invention.

FIG. 4 shows a schematic view of the second embodiment of the single optical fiber repeater system according to the invention. As shown in FIG. 4, two sets of first optical fiber sharing apparatus 41, second optical fiber sharing apparatus 43 and optical fiber 25 of the first embodiment are added between first external device 35 and second external device 37 in the conventional two-fiber architecture. A first switch 71 is disposed between first external device 35 and two first optical fiber sharing apparatuses 41. A second switch 73 is disposed between second external device 37 and two second optical fiber sharing apparatuses 43. First external device 35 and second external device 37 send control signal to control first switch 71 and second switch 73 to select one of the two sets of transport paths for transporting signals. This configuration can be deployed to connect a plurality of transport paths as well as in a single transport path for back up function.

The embodiment shows only two sets of optical fiber sharing apparatuses. In actual application, more sets can be applied. Also in actual application, first wavelength λ1 and second wavelength λ2 are any different two wavelengths selected from 600 nm to 1700 nm.

The main feature of the present invention is that, with a single optical fiber, signals can be transported in different wavelengths. Because the transport and the receiving share the same path, the time delay caused by path length asymmetry can be greatly reduced, and no regular time compensation correction is required; thus, material cost and labor cost are greatly reduced.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A single optical fiber repeater system, comprising:
    a first external device, for generating a first signal having a first wavelength;
    a second external device, for generating a second signal having the same first wavelength;
    a first switch;
    a second switch; and
    at least two transport paths, each transport path further comprising: a first optical fiber sharing apparatus, a second optical fiber sharing apparatus and an optical fiber; the first optical fiber sharing apparatus being connected to the first external device through the first switch, for transporting the first signal from the first external device to the optical fiber and receiving the second signal from the optical fiber to the first external device; the second optical fiber sharing apparatus being connected to the second external device through the second switch, for transporting the second signal from the second external device to the optical fiber and receiving the first signal from the optical fiber to the second external device; the optical fiber being connected to the first optical fiber sharing apparatus and the second optical fiber sharing apparatus, for transporting the first signal and the second signal;

wherein the first external device and the second external device generate control signals to control the first witch and the second switch respectively to select a transport path from the at least two transport paths for transporting the first signal and the second signal; the second optical fiber sharing apparatus converts the first wavelength of the second signal to a second wavelength different from the first wavelength for transporting in the optical fiber; and the first optical fiber sharing apparatus converts the second wavelength of the received second signal into the first wavelength and then passes the second signal having the first wavelength to the first external device.

2. The system as claimed in claim 1, wherein the first optical fiber sharing apparatus further comprises: a first filter, a second filter, a first splice terminal and a first wavelength convertor; the first filter being connected through the first switch to the first external device and connected to the first splice terminal; the first splice terminal being connected to the first filter and the second filter; the first wavelength convertor being connected to the second filter and connected through the first switch to the first external device;

the second optical fiber sharing apparatus further comprises: a third filter, a fourth filter, a second splice terminal and a second wavelength convertor; the third filter being connected through the second switch to the second external device and connected to the second splice terminal; the second splice terminal being connected to the third filter and the fourth filter; the second wavelength convertor being connected to the fourth filter and connected through the second switch to the second external device; the first splice terminal and the second splice terminal being connected through the optical fiber;

the first filter allowing the first signal having the first wavelength to be transported through the first splice terminal, the optical fiber and to the second splice terminal, and then through the third filter and the second switch to the second external device;

the second signal passing through second wavelength convertor and the first wavelength being converted into the second wavelength; the converted second signal having the second wavelength passing through the fourth filter to the second splice terminal; the third filter blocking the second signal having the second wavelength and the second signal passing through the optical fiber to the first splice terminal; the first filter blocking the second signal having the second wavelength, but the second filter allowing the second signal having the second wavelength to pass;

and then the first wavelength convertor converting the second signal from the second wavelength into the first wavelength, and then transporting the second signal having the first wavelength through the first switch to the first external device.

3. The system as claimed in claim 1, wherein the first wavelength and the second wavelength are any different two wavelengths selected from 600 nm to 1700 nm.

* * * * *